United States Patent [19]

Ishida et al.

[11] Patent Number: 5,316,321
[45] Date of Patent: May 31, 1994

[54] NONFERROUS PISTON RING WITH HARD SURFACE TREATMENT LAYER

[75] Inventors: Masao Ishida; Yoshio Naruse, both of Okaya, Japan

[73] Assignee: Teikoku Piston Ring Co., Ltd., Tokyo, Japan

[21] Appl. No.: 907,579

[22] Filed: Jul. 2, 1992

[30] Foreign Application Priority Data

Jul. 15, 1991 [JP] Japan ............... 3-63095[U]
Sep. 2, 1991 [JP] Japan ............... 3-248335

[51] Int. Cl.5 ............................... F16J 9/26
[52] U.S. Cl. .............. 277/235 A; 277/236; 277/DIG. 6
[58] Field of Search ........... 277/234, 235 A, 236, 277/DIG. 6

[56] References Cited

U.S. PATENT DOCUMENTS

| | | |
|---|---|---|
| 3,583,713 | 6/1971 | Sugahara ............... 277/235 A |
| 3,916,054 | 10/1975 | Long et al. ............... 277/96 X |
| 4,359,230 | 11/1982 | Bruni ............... 277/235 A X |
| 4,612,260 | 9/1986 | Kumagai et al. ............... 277/DIG. 6 X |
| 4,876,158 | 10/1989 | Onuki et al. ............... 277/235 A X |
| 5,076,866 | 12/1991 | Koike et al. . |
| 5,154,433 | 10/1992 | Naruse ............... 277/235 A |

FOREIGN PATENT DOCUMENTS

| | | | |
|---|---|---|---|
| 41649 | 2/1989 | Japan ............... | 277/235 A |
| 41650 | 2/1989 | Japan ............... | 277/235 A |
| 80861 | 3/1990 | Japan ............... | 277/235 A |
| 37477 | 2/1991 | Japan ............... | 277/235 A |
| 2141491 | 5/1984 | United Kingdom . | |

OTHER PUBLICATIONS

English Abstract for Japanese '551, Oct. 1985.
William F. Smith: "Structure and Properties of Engineering Alloys", 1981, pp. 256–257, 260, 411, 438–439, 449–451.

Primary Examiner—William A. Cuchlinski, Jr.
Assistant Examiner—Scott W. Cummings
Attorney, Agent, or Firm—Armstrong, Westerman, Hattori, McLeland & Naughton

[57] ABSTRACT

A piston ring is made of a titanium alloy, at least an outer peripheral surface and upper and lower surfaces thereof are formed with a nitrogen diffused layer, and at least an outer peripheral sliding surface thereof is coated with a hard film by physical vapor deposition on the nitrogen diffused layer.

11 Claims, 3 Drawing Sheets

NONFERROUS PISTON RING WITH HARD SURFACE TREATMENT LAYER

BACKGROUND OF THE INVENTION

1. Field of the Invention

The present invention relates to a piston ring (including a side rail of a combined oil ring) used for internal combustion engines and compressors, and particularly to a piston ring which is effective for internal combustion engines of high speed and high output and a method for manufacturing the same.

2. Description of the Related Art

An implementation of high speed and high output and low friction is intended for recent gasoline engines for automobiles, and the demands of function and quality of piston rings increase accordingly. Thus, it is urgent to solve a problem in that an amount of blow-by abruptly increases when a rotational speed of the engine exceeds a certain limit.

The phenomenon of the abrupt increase of the blow-by is closely related to fluttering of a piston ring. To address this problem, it has been considered to reduce a dimension of a ring width in order to reduce an inertia force of the piston ring or to design a torsion of a top ring.

However, the reduction in the ring width gives rise to the problem of lowering of a rigidity of the piston ring.

On the other hand, as a surface treatment of a piston ring made of steel, attention has been paid to a physical vapor deposition showing wear resistance and scuffing resistance in excess of chrome plating (Japanese Patent Laid-Open Publication Nos. 57-57868, 57-65837, 58-35648, etc.)

SUMMARY OF THE INVENTION

It is an object of the present invention to provide a piston ring which is excellent in wear resistance and scuffing resistance.

It is a further object of the present invention to provide a piston ring which is excellent in conformable property to a cylinder wall.

It is another object of the present invention to provide a piston ring made of titanium alloy which is easily manufactured.

The piston ring according to the present invention is made of a nonferrous metal having a Young's modulus of 15000 kgf/mm$^2$ or less and a tensile strength of 100 kgf/mm$^2$ or more, and has a hard surface treatment layer on at least an outer peripheral sliding surface.

As the desirable mode of the piston ring, the aforesaid nonferrous metal is a titanium alloy, at least an outer peripheral surface and upper and lower surfaces are formed with a nitrogen diffused layer, and at least an outer peripheral sliding surface is coated with a hard film by physical vapor deposition on the nitrogen diffused layer.

The piston ring in the present invention includes not only a compression ring but also a side rail of a combined oil ring.

As the nonferrous metal, a titanium alloy or a beryllium alloy can be used. Here, the titanium alloy may be a titanium alloy for structural purposes which is generally commercially used, such as $\alpha$-$\beta$ titanium alloys or $\beta$ titanium alloys.

Desirably, the thickness of the nitrogen diffused layer is in the range from 10 $\mu$m to 120 $\mu$m.

The hard film by physical vapor deposition may be a film composed of one or two kinds or more selected from a group of TiN, Ti(C, N), CrN, Cr(C, N). For example, TiN film or CrN film can be coated by ion plating Ti or Cr under atmosphere of nitrogen. The hard film by physical vapor deposition may be a single-layer film composed of one kind selected from the aforesaid materials or a plural-layer film composed of two kinds or more selected from the aforesaid materials or a film of a mixed material of two kinds or more selected from the aforesaid materials. Desirably, the thickness of the hard film is 2 $\mu$m to 50 $\mu$m in dependency of conditions for use of the piston ring.

A method for manufacturing a piston ring according to the present invention comprises the steps of applying nitriding to at least an outer peripheral surface and upper and lower surfaces of a piston ring blank made of a titanium alloy, pre-machining to a substrate of at least an outer peripheral sliding surface, and coating a hard film on at least the outer peripheral sliding surface by physical vapor deposition.

Desirably, the surface roughness of a substrate of the hard film is 0.8 $\mu$Rz or less.

For the nitriding, gas nitriding, salt-bath nitriding, plasma nitriding and the like may be used. Desirably, this treatment is carried out at a temperature less than a temperature capable of forming a nitrogen compound (less than about 730° C.).

When a piston ring is made of a titanium alloy, the weight can be reduced by about 40% as compared with a steel piston ring having the same dimension. This reduction in weight reduces an inertia force of a piston ring, reducing the occurences of fluttering, and can increase the in rotational speed when the amount of the blow-by abruptly increases.

When at least the outer peripheral sliding surface is formed with a hard film by physical vapor deposition, it is possible to impart excellent scuffing resistance and wear resistance to a piston ring made of titanium alloy.

Further, when the nitrogen diffused layer is employed as a substrate of the hard film by physical vapor deposition, the machining property of titanium alloy can be improved, and the lapping cost can be also reduced. Further, the effect of enhancing the fatigue resistance can be expected. Moreover, in the case where the hard film by physical vapor deposition becomes worn, the nitrogen diffused layer is exposed but as compared with the case where the titanium alloy base material is exposed, the wear is gentle and the scuffing less occurs, which are important merits. The upper and lower surfaces of a piston ring become worn by against the ring groove surface of a piston, but are excellent in wear resistance since the nitrogen diffused layer is formed.

When the surface roughness of the substrate of the hard film by physical vapor deposition is less than 0.8 $\mu$Rz, a lapping of the treated surface by physical vapor deposition is not necessary. Accordingly, it is not necessary to coat a hard film by physical vapor deposition having an extra thickness. Desirably, the surface roughness of the hard film by physical vapor deposition is 1.0 $\mu$Rz or less in terms of the wear of the cylinder.

When the nitriding is carried out at a temperature less than a temperature capable of forming a nitrogen compound, a layer of nitrogen compound injurious to physical vapor deposition is not formed on the surface. Thus, post-processing for removing a layer of nitrogen compound is unnecessary, and the step of processing can be shortened.

Further, when the side rail of the combined oil ring is made of nonferrous metal having a low Young's modulus (which is less than 15,000 kgf/mm$^2$), the rigidity of the side rail lowers, the conformable property with respect to the cylinder bore is enhanced, and the consumption of oil can be reduced.

BRIEF DESCRIPTION OF THE DRAWINGS

The aforesaid and other objects and features of the present invention will become more apparent from the following detailed description and the accompanying drawings.

DESCRIPTION OF THE PREFERRED EMBODIMENTS

A piston ring blank is preferably made from a titanium alloy (Ti-6Al-4V) wire material, which is an $\alpha$-$\beta$ titanium alloy, and the whole surface thereof is subjected to a gas nitriding. The composition of the titanium alloy (Ti-6Al-4V) is that Al is 5.5 to 6.75% and V is 3.5 to 4.5% in weight ratio, and the remainder is Ti. The Young's modulus of the titanium alloy (Ti-6Al-4V) is 11600 kgf/mm$^2$. The conditions of the nitriding are that gas pressure is $3\times 10^{-2}$ Torr, temperature is 740° C., and time of treatment is 4 hours. The thickness of a nitrogen diffused layer after nitriding was 95 $\mu$m. The thickness of a layer of nitrogen compound on the surface formed at that time is 2 $\mu$m. The layer of nitrogen compound is removed by lapping, and an outer peripheral sliding surface is lapped to have a surface roughness of 0.8 $\mu$Rz or less. The lapping of the nitrogen diffused layer is easier than the lapping of a titanium alloy base material. A hard film is coated on the outer peripheral sliding surface in a physical vapor deposition oven to obtain a compression ring according to the present invention. The physical vapor deposition is carried out under the conditions that partial pressure of nitrogen is $8\times 10^{-4}$ Torr, temperature is 460° C. and time of treatment is 45 minutes, and a TiN film is coated.

A further embodiment will be described below. In this case, the conditions are the same as the former embodiment except the nitriding conditions and the hard film by physical vapor deposition. The nitriding is carried out in the atmosphere of a mixture of nitrogen gas 95% and argon gas 5% under the conditions that the total gas pressure is $3\times 10^{-2}$ Torr, temperature is 720° C. and time of treatment is 2 hours. In this case, a layer of nitrogen compound injurious to physical vapor deposition is not formed on the nitrided surface, and only a nitrogen diffused layer was formed. Accordingly, the step of removing by lapping a layer of nitrogen compound is not necessary and the outer peripheral sliding surface is sufficient to be lapped to have a surface roughness of 0.8 $\mu$Rz or less. The lapping of the nitrogen diffused layer is easier than the lapping of a titanium alloy base material. Physical vapor deposition is carried out under the conditions that partial pressure of nitrogen is $5\times 10^{-4}$ Torr, temperature is 500° C. and time of treatment is 120 minutes, and a CrN film was coated.

Figure 1A:
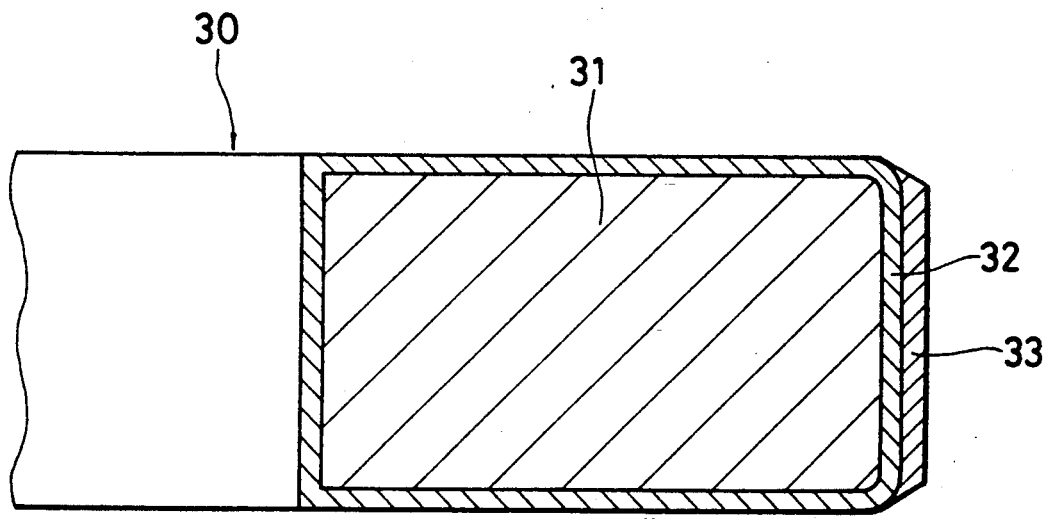
FIG. 1(A) is a longitudinal sectional view showing a part of compression ring according to one embodiment of the present invention.

FIG. 1(A) shows a compression ring 30 manufactured by the aforementioned method. Reference numeral 31 designates a titanium alloy base material; 32 designates a nitrogen diffused layer formed on the whole surfaces of an outer peripheral surface, upper and lower surfaces and an inner peripheral surface of, the compression ring 30; and 33 designates a hard film deposited by physical vapor deposition in an outer peripheral sliding surface, which is coated on the nitrogen diffused layer 32.

Figure 1B:
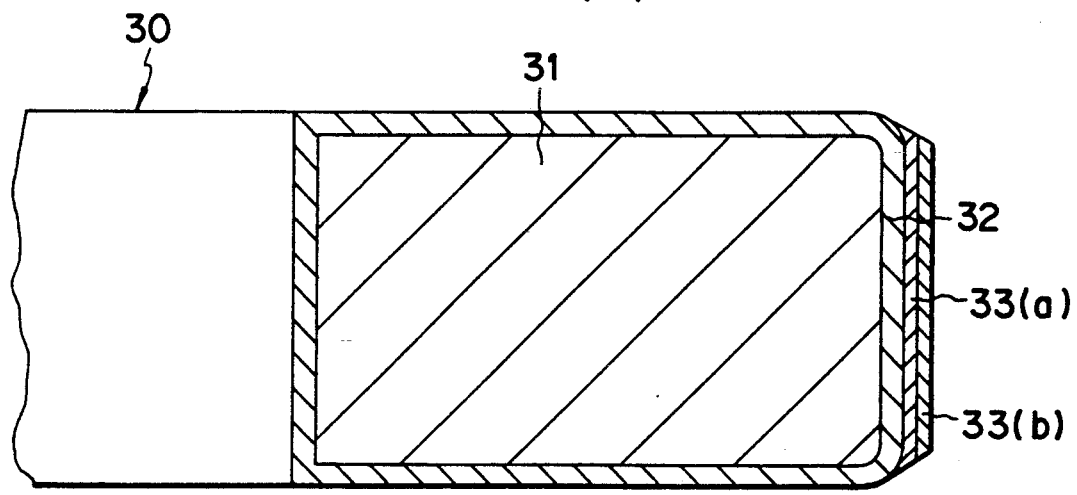
FIG. 1(B) is a longitudinal sectional view showing a modification of the embodiment of the present invention shown in FIG. 1(A).

FIG. 1(B) shows a plural layer hard film, in which the hard film is composed of two layers selected from the same group of compounds as the single layer hard film 33 shown in FIG. 1(A).

Another embodiment will be described hereinafter.

A coiled material was prepared from a titanium alloy (Ti-6Al-4V) wire, and the coiled material is wound around the outer periphery of a cylindrical member of the jig. Clamp disks of the jig are disposed on opposite ends of the coiled material. A nut is threadedly engaged with a tapped portion of a shaft portion which extends from one clamp disk and extends through a center hole of the other clamp disk, and the nut is axially tightened and fixed. Then, the nitriding was applied to the outer peripheral surface in a plasma nitriding oven. The conditions of the plasma nitriding are, for example, as follows:
Composition of atmospheric gases:
Nitrogen: hydrogen = 7:3
Work temperature: 500° C.

Since discharge occurs in only the outer peripheral surface of a workpiece in nitriding, the outer peripheral surface of the side rail is nitrided, but since the upper and lower surfaces have no clearance therebetween because they are in contact with each other and the inner peripheral surface is in contact with the cylindrical surface of the jig, no discharge occurs in these surfaces. Accordingly, it is possible to obtain a side rail in which upper and lower surfaces and an inner peripheral surface are free from a nitrided layer.

After the plasma nitriding, the coiled material is removed from the jig, and a hard chrome plating is applied to only the inner peripheral surface in a conventional method. The hard chrome plating is applied as a porous treatment to have a surface roughness of 5 to 20 $\mu$m by the inverse electrolysis treatment.

Thereafter, the workpiece is cut to form a side rail having a gap, and is finished in a conventional method.

It is to be noted that the plasma nitriding of an outer peripheral surface and the hard chrome plating of an inner peripheral surface may be carried out after the step of cutting a coiled material.

Figure 2:
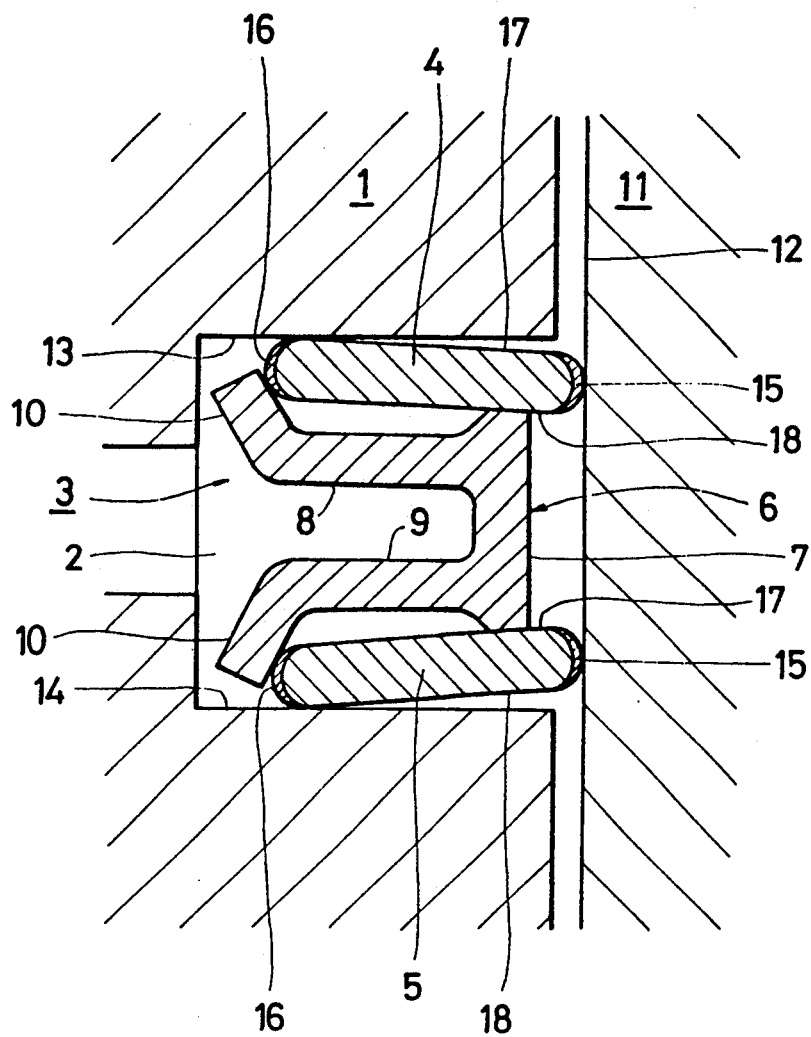
FIG. 2 showing a further embodiment of the present invention is a longitudinal sectional view of a combined oil ring which is fitted in an oil ring groove of a piston inserted into a cylinder and has side rails according to the present invention.

FIG. 2 shows a combined oil ring which is fitted into an oil ring groove of a piston inserted into a cylinder. The combined oil ring 3 fitted into an oil ring groove 2 of a piston 1 is composed of a pair of upper and lower side rails 4 and 5 which are annular with a gap, and a spacer expander 6 which is annular with a gap.

Figure 4:
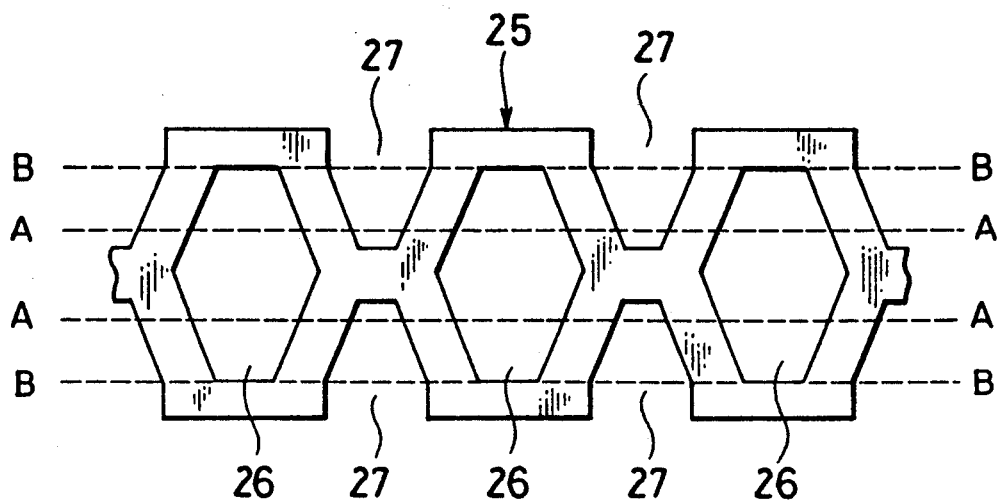
FIG. 4 is a plan view of a material for a spacer expander shown in FIG. 2.
Figure 5:
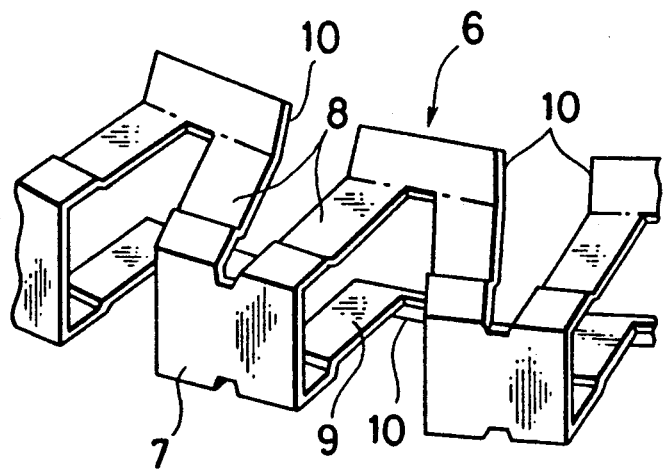
FIG. 5 is a perspective view showing a part of the spacer expander shown in FIG. 2.

The spacer expander 6 is formed, as shown in FIG. 4, by providing a plurality of hexagonal holes 26 serving as oil holes in a longitudinal direction of a thin steel strip 25, providing substantially V-shaped slits 27 on both sides of the thin steel strip 25 between the holes 26, bending both sides widthwise along the bending line A—A into a substantially U-shaped cross section so as to constitute side rail supporting portions by upper and lower pieces 8 and 9 connected by n upright piece 7 as shown in FIGS. 2 and 5, further bending end portions thereof outwardly and obliquely along the bending line B—B to constitute side rail pressing portions 10, cutting it into a predetermined length, and forming it to be annular so that the side rail pressing portions 10 are arranged at the position of the inner peripheral side. The spacer expander 6 is compressed and fitted into the oil ring groove 2 to generate a radially outwardly expanding force. The pair of side rails 4 and 5 are axially spaced apart by the upper and lower pieces 8 and 9, and the outer sliding surfaces of the side rails 4 and 5 are uniformly urged by pressing portions 10 and placed in close contact with the inner wall 12 of the cylinder to scrape off oil. The ends of the inner peripheral sides of the side rails 4 and 5 are pressed by the side rail pressing portions 10 and placed in close contact with the upper and lower surfaces 13 and 14 of the oil ring groove 2 to seal the upper and lower surfaces 13 and 14.

Figure 3:
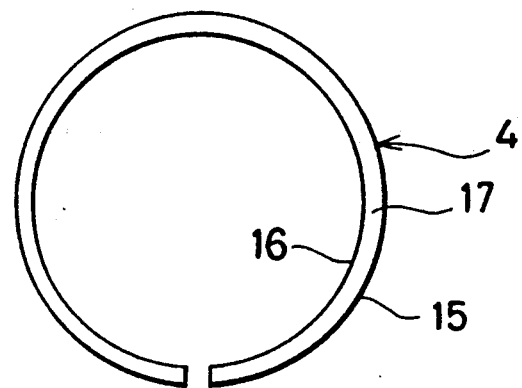
FIG. 3 is a plan view of the side rail shown in FIG. 2.

As shown in FIGS. 2 and 3, the side rails 4 and 5 made of titanium alloy are provided in only the outer peripheral surface with the plasma nitrided layer 15, in only the inner peripheral surface with the hard chrome plating layer 16, and the upper and lower surfaces thereof are base surfaces 17 and 18. It is to be noted that FIG. 3 typically shows the upper side rail 4, but the lower side rail 5 is similarly shown. Accordingly, since the side rails 4 and 5 are provided in only the outer peripheral surface with the plasma nitrided layer 15, good abrasion resistance with respect to the sliding contact with the inner wall 12 of the cylinder 11 is obtained. Since the hard chrome plating layer 16 is provided in only the inner peripheral surface, excellent abrasion resistance with respect to the sliding contact with the side rail pressing portions 10 of the spacer expander 6 is obtained. Since the upper and lower surfaces are base surfaces and so the contact surface with respect to the piston 1 made of aluminum alloy is soft, the abnormal abrasion of the oil ring groove 2 is hard to occur.

Figure 6:
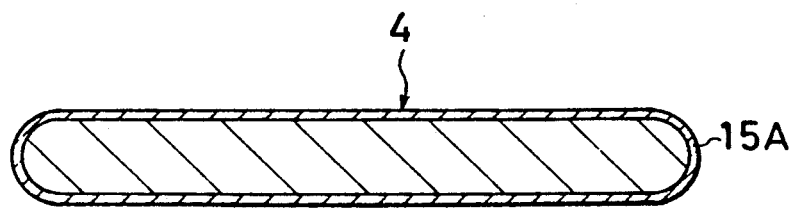
FIG. 6 is a longitudinal sectional view of a further side rail according to the present invention.

While in the above-described embodiment, the upper and lower surfaces of the side rail have been the base material surfaces, it is to be noted that normally, the upper and lower surfaces are also formed with a hard surface treatment layer. For example, in FIG. 6, the whole surface of the side rail 4 is subjected to nitriding to form a nitrided layer 15A on the whole surface.

While in the above-described embodiment, as the surface treatment, the chrome plating and nitriding were applied to the inner peripheral surface and outer peripheral surface, respectively, but these comprise no limitation. A hard surface treatment such as nitriding (such as gas nitriding, gas soft nitriding, salt-bath nitriding, plasma nitriding, etc.), physical vapor deposition (TiN, TiC, Ti(C, N), $Cr_xN_y$, $Cr_xC_y$, etc.), hard chrome plating (solid plating or porous plating), composite plating (ceramic particles are compounded to Ni-P or Ni-Co-P, etc.), ion implantation (N, C, etc.) or thermal spraying (Mo, etc.) may be applied to at least an outer peripheral sliding surface by a conventional manner.

According to the aforementioned side rail, the conformable property to the cylinder bore is improved and an oil consumption can be reduced.

As materials for the compression ring and the side rail in the aforementioned embodiment, a copper-beryllium alloy (which is composed of 1.8 to 2.75% (weight ratio) of Be, 0.2 to 0.9% (weight ratio) of Co and the remainder Cu, with a Young's modulus of 13500 kgf/mm$^2$) or the like is preferable, in addition to the aforementioned titanium alloy.

Since wire materials from which the aforementioned compression ring and the side rail are formed are subjected to plastic working several times in order to obtain a desired shape thereof, process annealing is necessary. Further, the wire materials are subjected to heat treatment after the materials have been shaped in the form of a ring to impart them mechanical properties including a hardness, for example, which should be provided for the compression ring or the side rail, and after this, they are completed by the finishing step.

Although the present invention has been described with reference to the preferred embodiments, it is apparent that the present invention is not limited to the aforesaid preferred embodiments, but various modification can be attained without departing from its scope.

What is claimed is:

1. A piston ring made of a nonferrous metal having a solid, non-porous construction with a Young's modulus of 15000 kgf/mm$^2$ or less and a tensile strength of 100 kgf/mm$^2$ or more, said piston ring including a hard surface treatment layer on at least an outer peripheral sliding surface thereof.

2. A piston ring according to claim 1, wherein said nonferrous metal is a titanium alloy.

3. A piston ring according to claim 1, wherein said nonferrous metal is a copper-beryllium alloy.

4. A piston ring according to claim 1, wherein said hard surface treatment layer is a surface treatment layer formed by at least one treatment selected from a group consisting of nitriding, physical vapor deposition, hard chrome plating, composite plating, ion implantation and thermal spraying.

5. A piston ring according to claim 1, wherein said nonferrous metal is a titanium alloy, at least an outer peripheral surface and upper and lower surfaces of said ring are formed with a nitrogen diffused layer, and at least an outer peripheral sliding surface of said ring is coated with a hard film by physical vapor deposition on the nitrogen diffused layer.

6. A piston ring according to claim 5, wherein a surface roughness of a substrate of said hard film is 0.8 μRz or less.

7. A piston ring according to claim 5, wherein said hard film is a single-layer film composed of one kind selected from a group consisting of TiN, Ti(C, N), CrN, and Cr(C, N).

8. A piston ring according to claim 5, wherein said hard film is a plural-layer film composed of two kinds or more selected from a group consisting of TiN, Ti(C, N), CrN and Cr(C, N).

9. A piston ring according to claim 5, wherein said hard film is a film of a mixed material of two kinds or more selected from a group consisting of TiN, Ti(C, N), CrN and Cr(C, N).

10. A piston ring according to claim 5, wherein a thickness of said hard film is 2 to 50 μm.

11. A piston ring according to claim 5 or 10, wherein a thickness of said nitrogen diffused layer is 10 to 120 μm.

* * * * *